(12) United States Patent
Ducarme et al.

(10) Patent No.: US 7,098,427 B2
(45) Date of Patent: Aug. 29, 2006

(54) DEVICE FOR FILTRATION OF THE FRYING BATH IN AN ELECTRIC FRYER HAVING AN IMMERSED HEATING RESISTOR

(75) Inventors: Valérie Vuillemot Ducarme, Dienay (FR); Frédéric Seurat, Dijon (FR)

(73) Assignee: SEB S.A., Ecully (FR)

( * ) Notice: Subject to any disclaimer, the term of this patent is extended or adjusted under 35 U.S.C. 154(b) by 67 days.

(21) Appl. No.: 10/871,552

(22) Filed: Jun. 21, 2004

(65) Prior Publication Data

US 2005/0016386 A1    Jan. 27, 2005

(30) Foreign Application Priority Data

Jun. 19, 2003   (FR) .................................. 03 07415

(51) Int. Cl.
*A47J 37/12* (2006.01)
(52) U.S. Cl. ............... 219/437; 219/430; 219/439; 99/403; 99/408
(58) Field of Classification Search ............... None
See application file for complete search history.

(56) References Cited

U.S. PATENT DOCUMENTS

| 2,053,568 | A | * | 9/1936 | Levin ........................ 99/408 |
|---|---|---|---|---|
| 3,263,596 | A | * | 8/1966 | Thomas ..................... 99/408 |
| 4,805,525 | A | * | 2/1989 | Bivens ...................... 99/408 |
| 5,404,799 | A | * | 4/1995 | Bivens ...................... 99/408 |
| 6,363,834 | B1 | | 4/2002 | Song |
| 6,820,540 | B1 | * | 11/2004 | Bivens ...................... 99/408 |
| 6,955,118 | B1 | * | 10/2005 | Bivens ...................... 99/408 |

FOREIGN PATENT DOCUMENTS

| BE | 1013656 A3 | * | 5/2002 |
|---|---|---|---|
| CH | 591841 A | * | 9/1977 |

\* cited by examiner

*Primary Examiner*—J. Pelham
(74) *Attorney, Agent, or Firm*—Browdy and Neimark, PLLC

(57) ABSTRACT

A device for filtering the frying bath of an electric fryer having a heating resistor that is immersed in a frying bath in a tank during frying, the device including: a filter screen adapted to extend beneath the immersed electric resistor; and at least one holding element for connecting said screen to the immersed electric resistor. An electric fryer composed of: a tank provided to receive a frying bath; an electric heating resistor provided to be immersed in the frying bath; and the device described above.

19 Claims, 3 Drawing Sheets

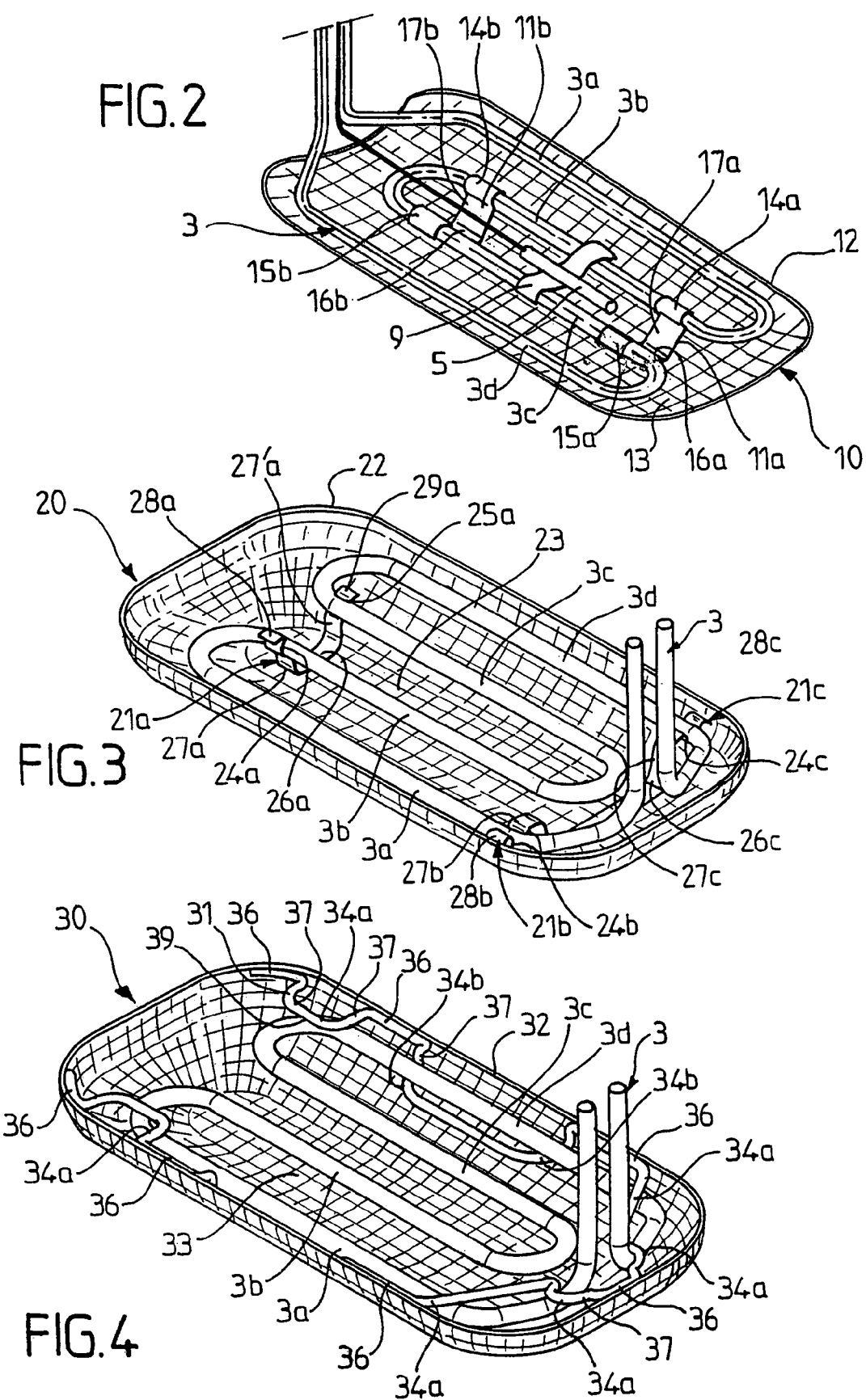

DEVICE FOR FILTRATION OF THE FRYING BATH IN AN ELECTRIC FRYER HAVING AN IMMERSED HEATING RESISTOR

BACKGROUND OF THE INVENTION

The present invention relates to the technical field of electric fryers and concerns more particularly electric fryers having an immersed electric heating resistor. The invention relates more specifically to filtration of the frying medium of such an electric fryer.

In fryers of the type mentioned above, heating of the frying medium is effected by an electric heating resistor immersed in the frying bath. The heating resistor is generally removable from the tank that contains the frying bath.

U.S. Pat. No. 6,363,834 describes an electric fryer having an immersed heating resistor on which a filter screen is disposed.

This arrangement permits recovery of cooking residues on the filter screen. These residues can then be withdrawn from the frying bath along with the immersed resistor carrying the filter screen.

This form of construction presents, however, the drawback of promoting carbonization of the cooking residues.

BRIEF SUMMARY OF THE INVENTION

The present invention provides a device for filtering the frying bath of an electric fryer having an immersed resistor in a particularly simple manner. Furthermore, the present invention provides a device that limits degradation of the frying bath of such an electric fryer.

More specifically, the present invention provides a device for filtering the frying bath of an electric fryer, the device being composed of a filter screen extending beneath an immersed electric resistor provided to be disposed in a tank containing the cooking bath, wherein the filter screen is connected to the immersed electric resistor by at least one holding, or retaining, element. This arrangement permits the filter screen to be placed in a cooler zone of the frying bath. Carbonization of residues collected on the filter screen can then be greatly reduced, or even completely prevented, which permits maintenance of a frying bath of better quality. The filtration operation is effectuated simply by withdrawing the immersed electric resistor from the frying bath.

Advantageously, the filter screen has a filtering wall mounted at a distance from the electric resistor. This arrangement permits direct heating of the filtering wall to be limited and thus contributes to reducing degradation of the residues.

Also advantageously, the filter screen is concave, thereby permitting improved retention of the residues during filtration.

Further advantageously, in order to facilitate cleaning, the filter screen is mounted to be removable from the electric resistor.

Also advantageously, the at least one holding element is secured to the filter screen and is detachable from the resistor. Alternatively, the holding element can extend from, or be fixed to, the electric resistor.

Also advantageously, the holding element has at least one retention zone associated with the electric resistor and at least one attachment zone associated with the filter screen.

Further advantageously, the retention zone is deformable, thereby permitting removal of the filter screen from the electric resistor.

According to a further advantage, the holding element has a connection, or linkage, zone between the retention zone and the attachment zone. This permits creation of a thermal break, or barrier, between the electric resistor and the filter screen.

According to a further advantage, the connection zone is deformable, thereby aiding separation of the filter screen from the electric resistor.

According to another advantage, in order to facilitate removal of the filter screen, the retention zone is prolonged by a handling zone.

Alternatively, the holding element is relatively rigid and the electric resistor can then be deformed slightly to be separated from one or more of the retention zones.

According to an advantageous form of construction, the holding element is fixed on a filtering wall of the filter screen. Preferably then, the holding element has a connection zone between the attachment zone and the retention zone.

According to another advantageous form of construction, the holding element is fixed on a peripheral edge of the filter screen. This holding element can also have a connection zone between the attachment zone and the holding zone.

The invention is additionally embodied in an electric fryer having a tank provided to receive a frying bath, an immerseable electric heating resistor provided to be disposed in the tank, and a filter screen, wherein the filter screen belongs to a filter device as described above.

BRIEF DESCRIPTION OF THE DRAWINGS

FIGS. 2–4 are perspective views showing three embodiments of a filter device and associated heating resistor according to the invention.

DETAILED DESCRIPTION OF THE INVENTION

Figure 1:
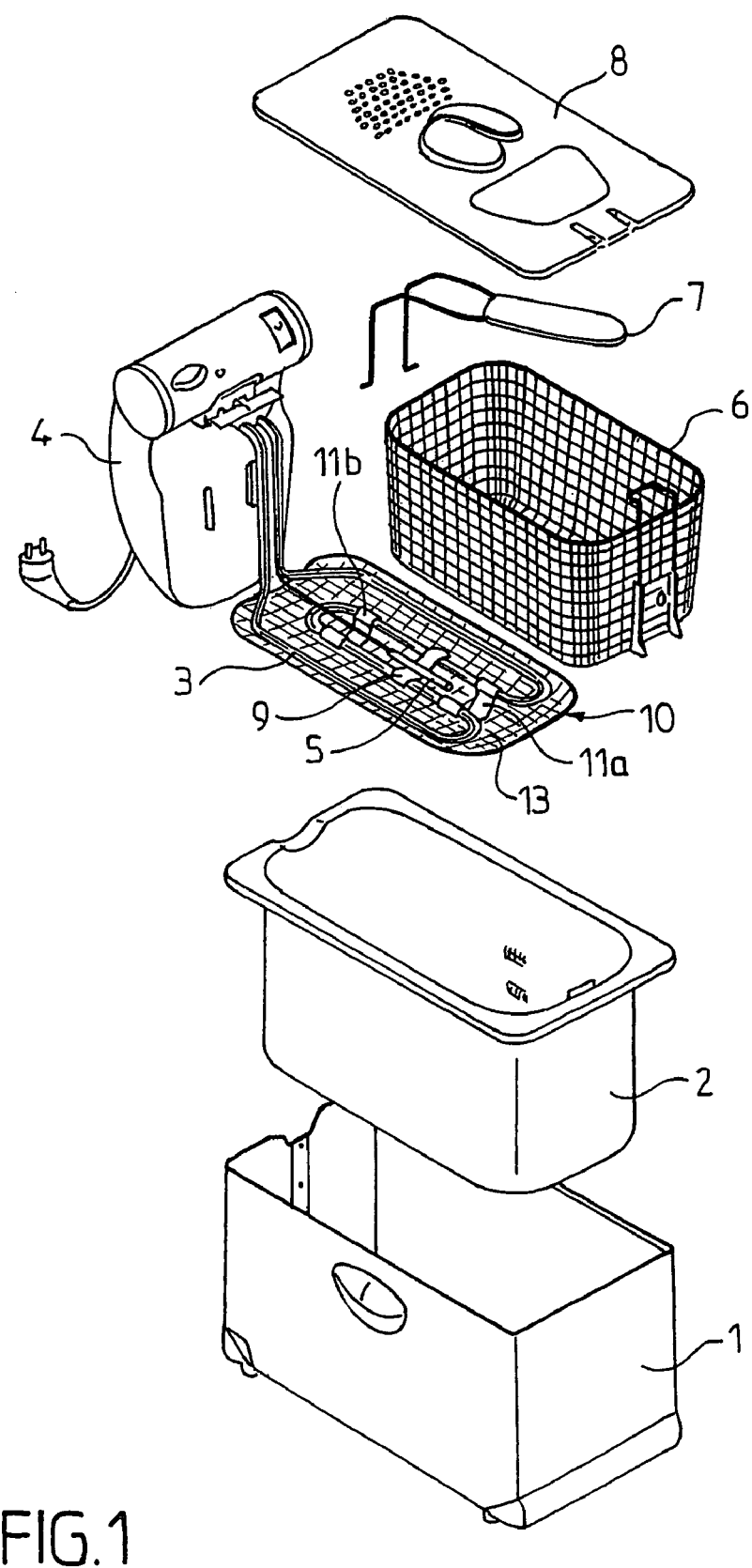
FIG. 1 is an exploded, perspective view of the components of an electric fryer equipped with an embodiment of the invention.

FIG. 1 shows an electric fryer having a housing 1 receiving a tank 2 intended to contain a frying bath such as a bath of oil or melted fat. An electric resistor 3 is arranged to be immersed in the bath in order to heat the frying medium. Electric resistor 3 emerges from a case 4 containing the controls for the fryer. A temperature sensor 5 is arranged between the legs of resistor 3 and is, for example, associated with a thermostat, which may be constructed to provide electronic regulation of the temperature of the frying medium. A frying basket 6 is provided to contain the food to be fried. A removable handle 7 is provided in order to facilitate removal of basket 6 from tank 2. A lid 8 is provided to close tank 2 when the fryer is assembled for use, resistor 3 will be positioned below basket 6.

The electric fryer further includes a filter screen 10 belonging to a filtration device for the frying bath. Screen 10 is attached to resistor 3 and extends below resistor 3. Filter screen 10 has essentially a concave form, in order to better retain cooking residues coming from basket 6. Filter screen 10 is arranged at a distance from resistor 3 in order to reduce heating of screen 10 and of the residues collected therein.

More particularly, as is shown more clearly in FIG. 2, electric resistor 3 has several parallel legs 3a, 3b, 3c and 3d connected together by curved parts. Two interior legs 3b, 3c are connected together at one of their ends and are connected at their other ends to respective ones of outer legs 3a, 3d. Temperature sensor 5 is mounted between inner legs 3b, 3c by means of a transverse attachment piece 9.

Screen 10 is connected to resistor 3 by two holding elements 11a and 11b. Screen 10 is composed of a peripheral edge 12 and a filtering wall 13 that is surrounded by edge 12. Cooking residues that drop from basket 6 are collected on filtering wall 13. Filtering wall 13 has a concave form and extends below resistor 3. Filtering wall 13 is, for example, constituted by a wire mesh that preferably has a mesh size smaller than that of basket 6. The dimensions of filter screen 10 are selected to preferably leave a minimum space between screen 10 and the lateral walls of tank 2.

Holding elements 11a and 11b each have a generally V-shaped form and the two upper ends of each of those elements form holding zones 14a, 14b, 15a, 15b for holding resistor 3. Each of elements 11a, 11b has a center part that is lower than the holding zones and that forms an attachment zone 16a, 16b secured to filtering wall 13. Connection, or linkage, zones 17a, 17b extend between each holding zone 14a, 14b, 15a, 15b and corresponding attachment zone 16a, 16b. Holding elements 11a and 11b are formed, for example, by metallic tongues made of stainless steel soldered or brazed to filtering wall 13.

When the user withdraws resistor 3 from tank 2 containing a cooking bath, filter screen 10 arranged under resistor 3 collects cooking residues such as for example scorched pieces that have fallen into the frying bath during previous withdrawal of basket 6 from tank 2. Filter screen 10, disposed at a distance from resistor 3, permits collection of the cooking residue in a cooler zone of the frying bath, due particularly to the presence of connecting zones 17a and 17b and to the concave form of filtering wall 13. Degradation of the cooking residues is thus slowed, which permits a better frying bath quality to be maintained.

Two alternative filter screens 20,30 removably assembled to resistor 3 are shown in FIGS. 3 and 4. The alternative embodiment shown in FIG. 3 differs from that of FIG. 2 in that filter screen 20 is more basin-shaped, has a peripheral edge 22 surrounding a filtering wall 23, and is connected to resistor 3 by three holding elements 21a, 21b and 21c.

Figure 3A:
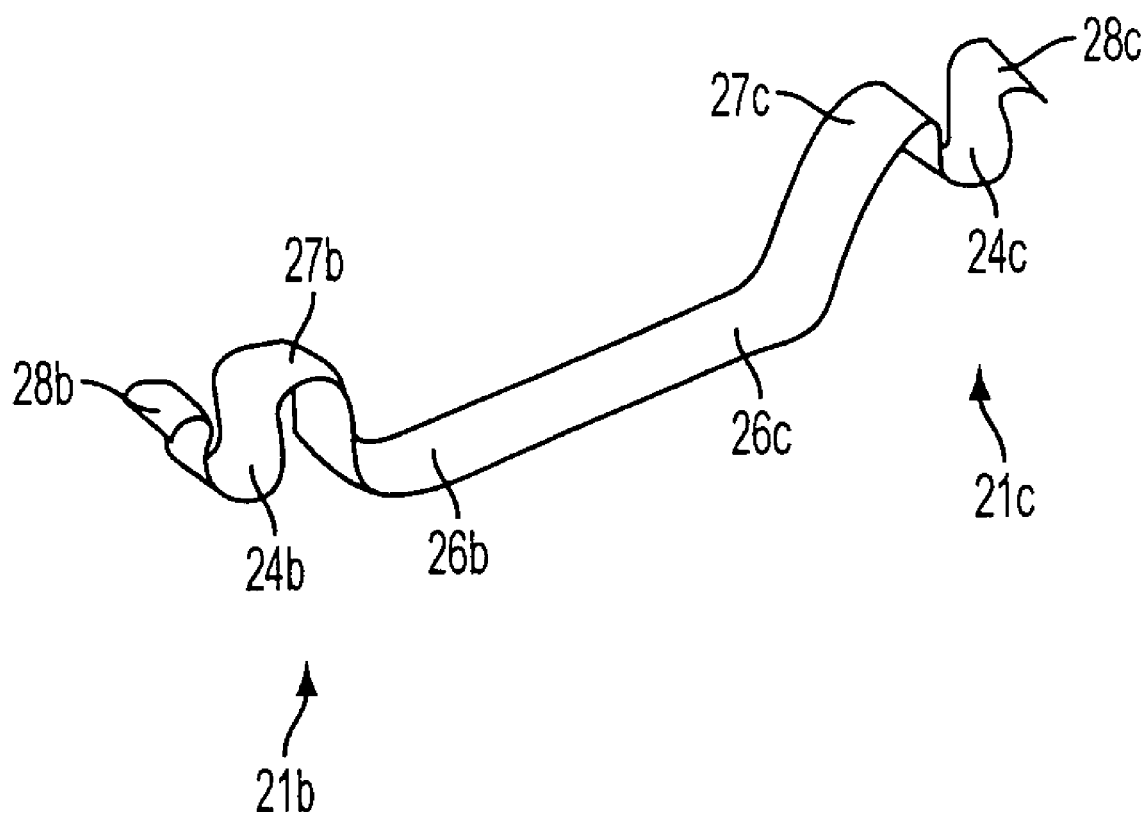
FIG. 3A is a detail view of a component of the embodiment of FIG. 3.

Each holding element 21a, 21b and 21c has an attachment zone, shown at 26a for element 21a and at 26c for element 21c. The attachment zone 26b for element 21b is shown in FIG. 3A. Each attachment zone 26b, 26c is secured to filtering wall 23.

Holding element 21a is arranged on the longitudinal axis of filter screen 20 and is formed by a U-shaped tongue whose lower part is attachment zone 26a. The legs of the tongue are formed with respective concave formations that form holding zones 24a and 25a. These holding zones grip outer lateral faces of inner legs 3b and 3c, respectively, of resistor 3. The free ends of the tongues form manipulating, or handling, zones 28a and 29a permitting the user to detach holding zones 24a and 25a from resistor 3. The legs of the tongue also form connection zones 27a, 27a' between holding zones 24a, 25a and attachment zone 26a.

Holding elements 21b and 21c are arranged to one side and the other of the longitudinal axis of filter screen 20, at a distance from holding element 21a. According to one possible form of construction of holding elements 21b and 21c, shown in FIG. 3A, they may be made in one piece. Each holding element 21b, 21c includes tongues having branches extending from their attachment zone 26b, 26c. The branches present an upper concave receptacle forming a retention zone 24b, 24c. Each concave receptacle extends in total over more than 180° around the associated resistor leg to permit retention of filter screen 20 under resistor 3. Retention zones 24b and 24c come to grip the lower sides of outer legs 3a and 3d, respectively, of resistor 3. The free end of each of the tongues forms a handling zone 28b, 28c permitting retention zones 24b, 24c to be detached from resistor 3. The tongues have connection zones 27b, 27c between retention zones 24b, 24c, on the one hand, and the corresponding attachment zones 26b, 26c, on the other hand.

Holding elements 21a, 21b, 21c are deformable at the level of retention zones 24a, 25a, 24b, 24c and/or connection zones 27a, 27'a, 27b, 27c to permit the user to withdraw filter screen 10 from resistor 3, for example for cleaning.

The alternative embodiment shown in FIG. 4 differs from the examples shown in FIGS. 2 and 3 in that filter screen 30 has a peripheral border, or rim, 32 surrounding a filtering wall 33 and connected to resistor 3 by a holding element 31 fixed to peripheral border 32.

Holding element 31 is formed by a rod that is bent at several points and that is made, for example, of stainless steel. Holding element 31 has two parts that are symmetrical at one side and the other of the longitudinal axis of filter screen 30. Holding element 31 is fixed to peripheral border 32 at attachment zones 36, for example by soldering or brazing. Holding element 31 is composed of several inwardly extending protuberances spaced from the peripheral border. The inwardly extending protuberances form retention zones 34a, 34b on both sides of screen 30. Retentions zones 34a hold outer legs 3a, 3d of resistor 3 from above, while retention zones 34b hold legs 3a, 3d of resistor 3 from below. Connection zones 37 are arranged between attachment zones 36 and retention zones 34a, 34b. Resistor 3 is thus held at a distance from filtering wall 33 and from peripheral border 32.

The elasticity of resistor 3 permits a lateral disengagement of outer legs 3a, 3d from the holding element.

According to a complementary variant, retention zones 34a, 34b can be formed by several separate holding elements 31.

According to another complementary variant, other geometries can be envisioned for resistor 3 and for holding elements 11a, 11b; 21a, 21b, 21c; and 31.

According to a further complementary variant, holding elements 11a, 11b; 21a, 21b, 21c; and 31 are not necessarily all fixed only to the filtering wall or only to the peripheral border of the filter screen.

According to yet another complementary variant, at least one deformable holding element can form a unit with filter screen 10, displacement of resistor 3 permitting disengagement of the other holding element or elements from the filter screen.

According to still another complementary variant, filtering wall 13, 23, or 33 is not necessarily formed by a mesh, but instead can be formed by a perforated sheet.

According to yet a further complementary variant, the holding elements could form a unit with resistor 3 in order to cooperate with filter screen 10, 20, or 30.

According to yet another complementary variant of the invention, tank 2 can have at least one retention means provided to suspend the filter screen in a raised position above the frying bath, to permit draining. The retention means is for example a hook or a lug forming part of a lateral interior face of the tank. The retention means can cooperate with the filter screen and/or with the resistor. The retention means is preferably disposed at the side opposite to the case containing control elements for the resistor.

The filtration device for a frying bath according to the invention can be formed by a filter screen provided to be mounted below an immersed electric resistor. The filtration device then forms an accessory that can be associated with the immersed electric resistor.

The filtration device for a frying bath according to the invention can equally comprise a filter screen and an immersed electric resistor, the filter screen being mounted in a manner that may or may not be removable below the immersed electric resistor.

This application relates to subject matter disclosed in French Application number FR 03 07415, filed on Jun. 19, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for filtering a frying bath of an electric fryer having an electric heating resistor that is immersed in the frying bath in a tank during frying, said device comprising:
   a concave filter screen adapted to extend beneath the resistor; and
   at least one holding element for connecting said screen to the resistor.

2. The device of claim 1, wherein said concave filter screen comprises a filtering wall, and said holding element is adapted to maintain said filtering wall at a distance from the resistor when said filter screen is connected to the resistor by said holding element.

3. The device of claim 1, wherein said at least one holding element is adapted to permit said filter screen to be disconnected from the resistor.

4. The device of claim 3, wherein said at least one holding element is secured to said filter screen and is detachable from the resistor.

5. The device of claim 1, wherein said at least one holding element is secured to said filter screen and is engageable with the resistor.

6. The device of claim 5, wherein said at least one holding element has at least one retention zone for attachment to the electric resistor and at least one attachment zone associated with the filter screen.

7. The device of claim 6, wherein the retention zone is deformable.

8. The device of claim 5, wherein said filter screen comprises a filtering wall to which said at least one holding element is fixed.

9. An electric fryer comprising: a tank provided to receive a frying bath; an electric heating resistor provided to be immersed in the frying bath; and the device defined in claim 1, wherein said at least one holding element connects said screen to said electric resistor.

10. A device for filtering a frying bath of an electric fryer having an electric heating resistor that is immersed in the frying bath in a tank during frying, said device comprising:
   a filter screen adapted to extend beneath the resistor; and
   at least one holding element for connecting said screen to the resistor, wherein:
   said at least one holding element is secured to said filter screen and is engageable with the resistor;
   said at least one holding element has at least one retention zone for attachment to the electric resistor and at least one attachment zone associated with the filter screen;
   the retention zone is deformable; and
   said at least one holding element has a connection zone between said retention zone and said attachment zone.

11. The device of claim 10, wherein said connection zone is deforrnable.

12. A device for filtering a frying bath of an electric fryer having an electric heating resistor that is immersed in the frying bath in a tank during frying, said device comprising:
   a filter screen adapted to extend beneath the resistor; and
   at least one holding element for connecting said screen to the resistor, wherein:
   said at least one holding element is secured to said filter screen and is engageable with the resistor;
   said at least one holding element has at least one retention zone for attachment to the electric resistor and at least one attachment zone associated with the filter screen; and
   said at least one holding element has a connection zone between said retention zone and said attachment zone.

13. The device of claim 12, wherein said connection zone is deformable.

14. A device for filtering a frying bath of an electric fryer having an electric heating resistor that is immersed in the frying bath in a tank during frying, said device comprising:
   a filter screen adapted to extend beneath the resistor; and
   at least one holding element for connecting said screen to the resistor, wherein:
   said at least one holding element is secured to said filter screen and is engageable with the resistor;
   said at least one holding element has at least one retention zone for attachment to the electric resistor and at least one attachment zone associated with the filter screen; and
   said at least one holding element further comprises a handling zone constituted by a prolongation of said retention zone.

15. A device for filtering a frying bath of an electric fryer having an electric heating resistor that is immersed in the frying bath in a tank during frying, said device comprising:
   a filter screen adapted to extend beneath the resistor; and
   at least one holding element for connecting said screen to the resistor, wherein:
   said at least one holding element is secured to said filter screen and is engageable with the resistor; and
   said filter screen has a peripheral edge to which said at least one holding element is fixed.

16. A unit for an electric fryer containing a frying bath in a tank, said unit comprising:
   an electric heating resistor that is immersed in the frying bath when food is being fried;
   a concave filter screen disposed beneath said resistor; and
   at least one holding element connecting said screen to said resistor.

17. An electric fryer comprising: a tank provided to receive a frying bath; an electric heating resistor provided to be immersed in the frying bath; and a device for filtering a frying bath of an electric fryer having an electric heating resistor that is immersed in the frying bath in a tank during frying, said device comprising:
   a filter screen adapted to extend beneath the resistor; and at least one holding element for connecting said screen to the resistor, wherein said tank comprises at least one retention means provided to suspend the filter screen in a raised position above the frying bath, and said at least one holding element connects said screen to said electric resistor.

18. The electric fryer of claim 17, wherein said at least one retention means is part of a lateral interior face of said tank.

19. The electric fryer of claim 18, wherein said fryer further comprises a case containing control elements for the resistor, said case being disposed at one side of said tank, and wherein said at least one retention means is disposed at the side of said tank opposite to said one side.

\* \* \* \* \*